Figure 1:
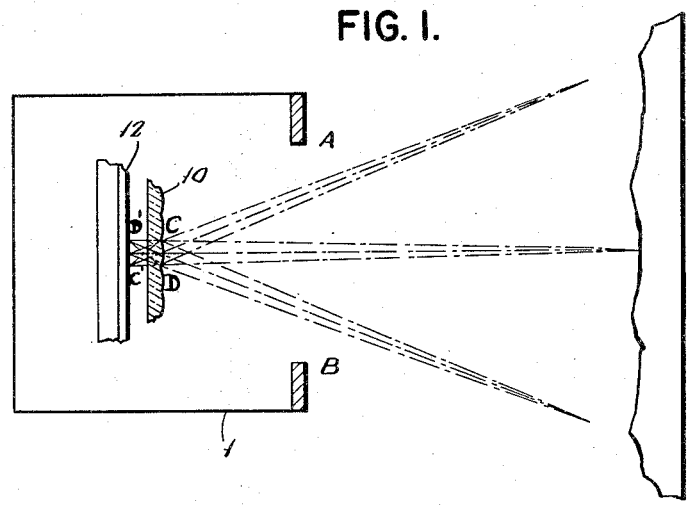
Figure 2:
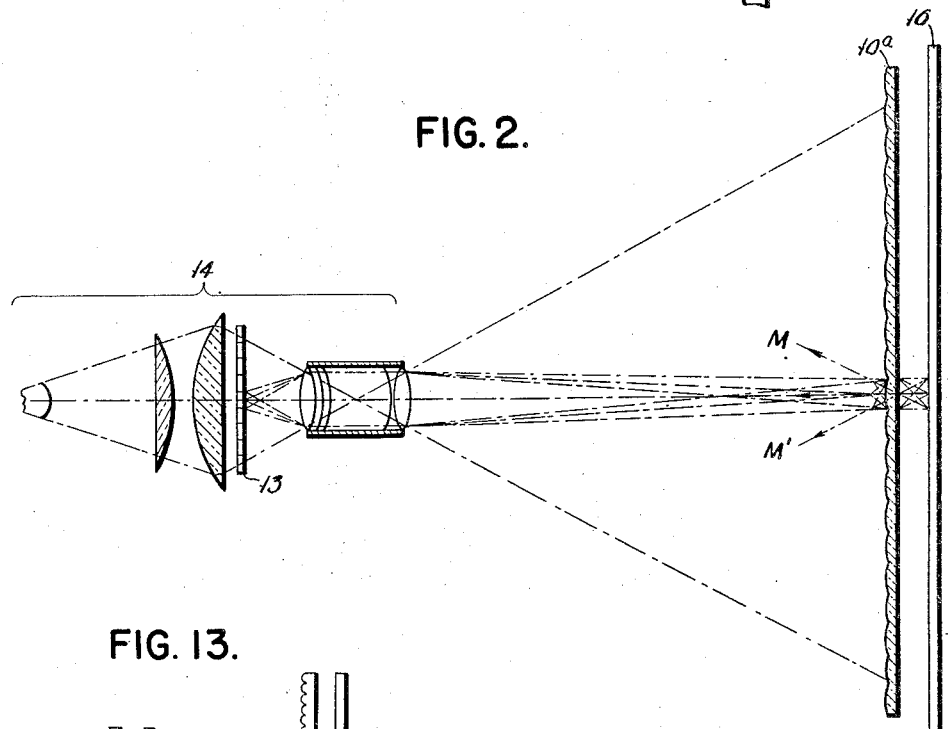
Figure 13:
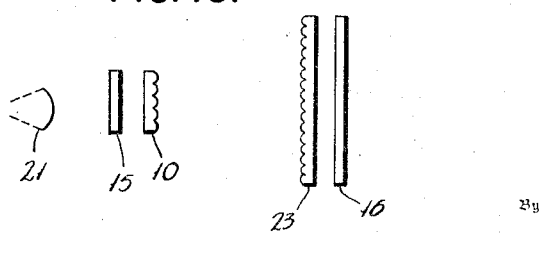
Figure 3:
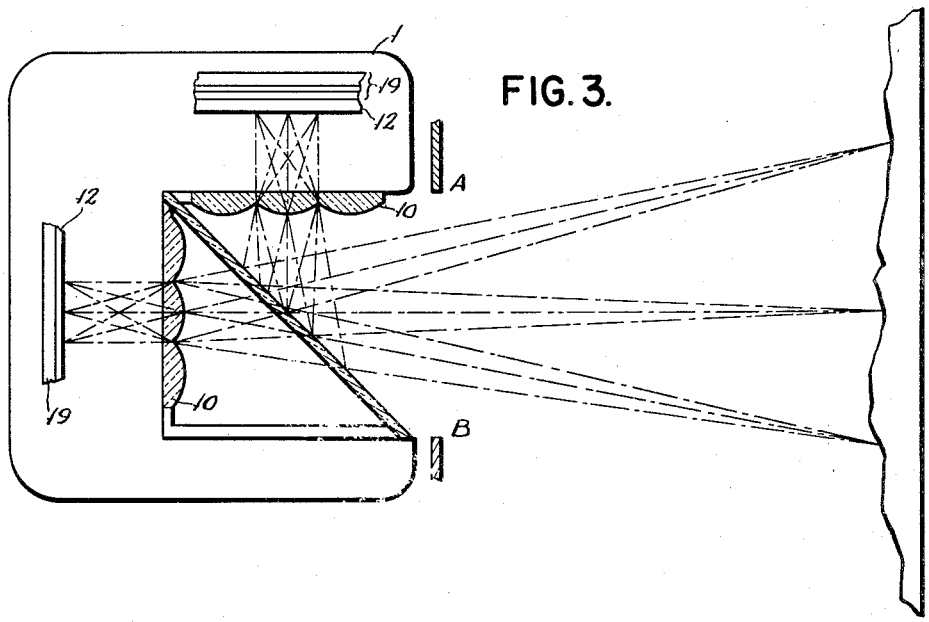
Figure 4:
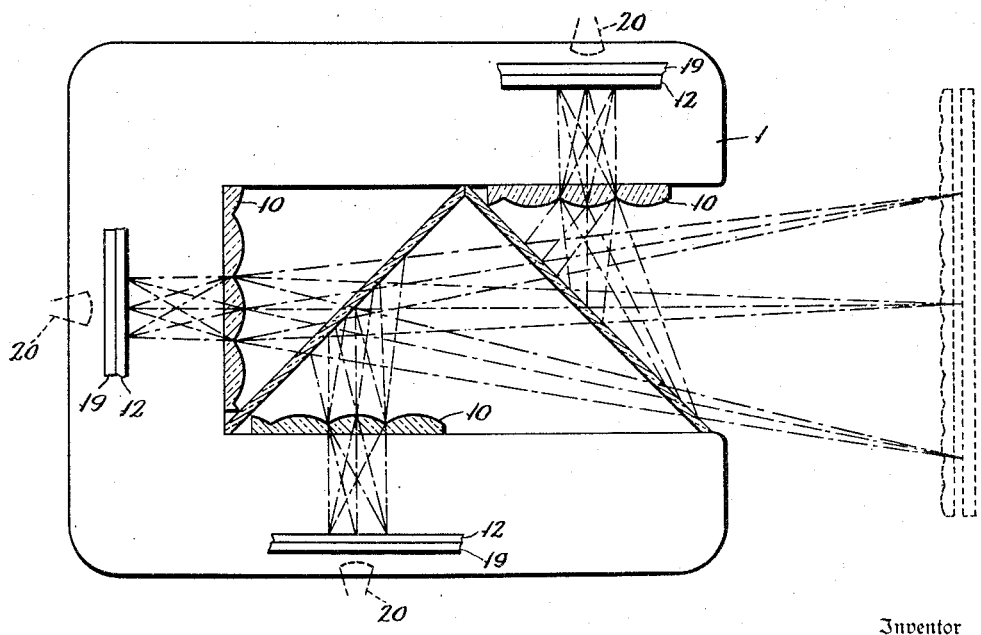
Figure 7:
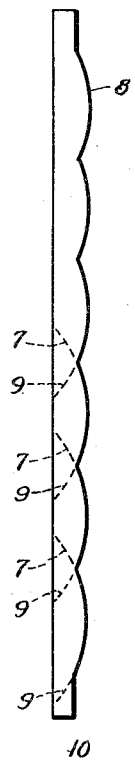
Figure 8:
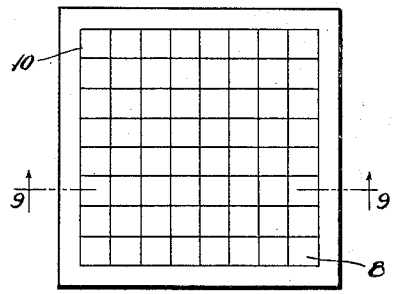
Figure 9:
Figure 5:
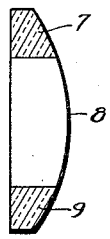
Figure 6:
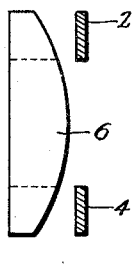
Figure 10:
Figure 11:
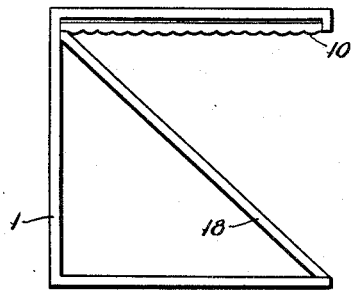
Figure 12:
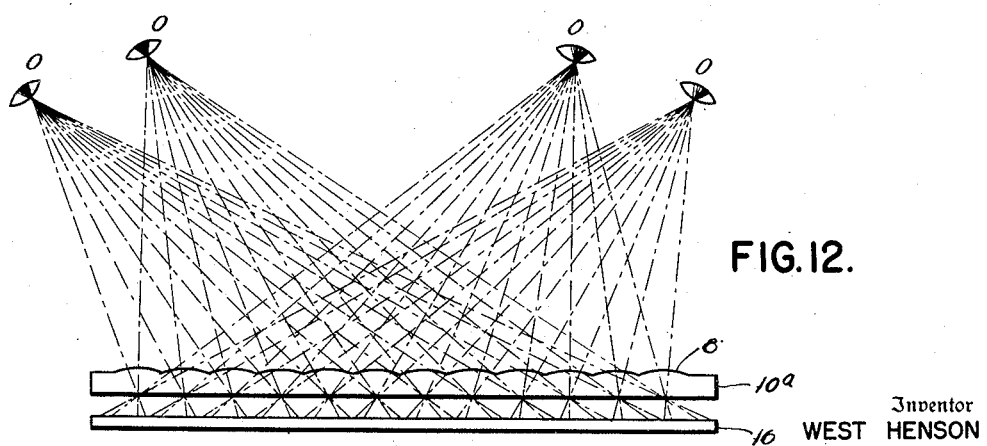
Figure 14:
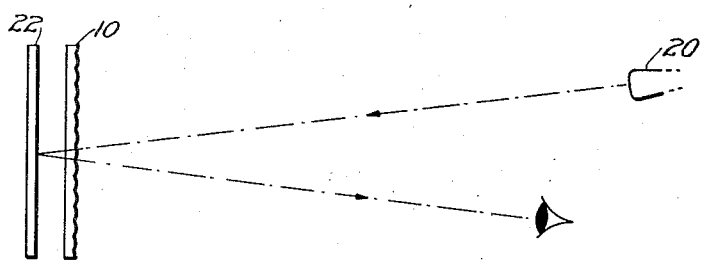
Figure 15:
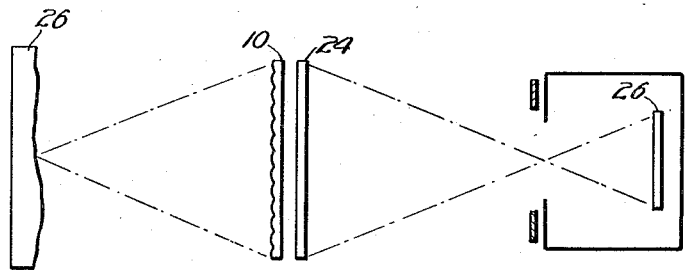
Figure 16:
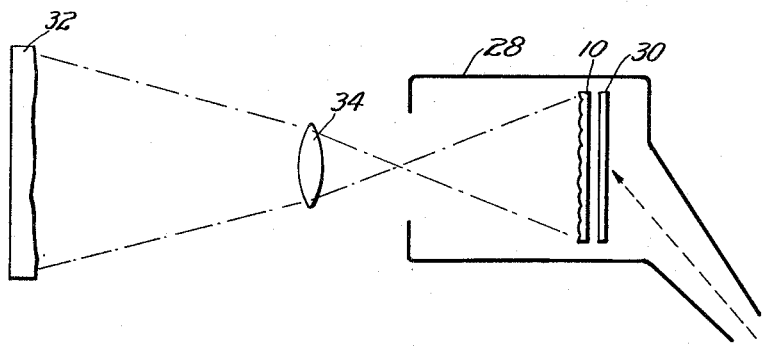
Figure 17:
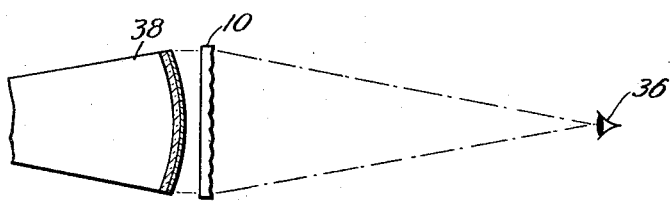

April 24, 1951 W. HENSON 2,550,350
LENS SCREEN TO PRODUCE STEREOSCOPIC EFFECTS
Filed July 8, 1948 4 Sheets-Sheet 1

Inventor
WEST HENSON
Dodson + Dytman
Attorneys

April 24, 1951 W. HENSON 2,550,350
LENS SCREEN TO PRODUCE STEREOSCOPIC EFFECTS
Filed July 8, 1948 4 Sheets-Sheet 2

Inventor
WEST HENSON
By Dodson + Dytman
Attorneys

April 24, 1951 W. HENSON 2,550,350
LENS SCREEN TO PRODUCE STEREOSCOPIC EFFECTS
Filed July 8, 1948 4 Sheets-Sheet 3

Inventor
WEST HENSON
By Dodson + Dykman
Attorneys

April 24, 1951 W. HENSON 2,550,350
LENS SCREEN TO PRODUCE STEREOSCOPIC EFFECTS

Filed July 8, 1948 4 Sheets-Sheet 4

INVENTOR
WEST HENSON
BY Dodson + Dykman
ATTORNEYS

Patented Apr. 24, 1951

2,550,350

UNITED STATES PATENT OFFICE 2,550,350

LENS SCREEN TO PRODUCE STEREO-
SCOPIC EFFECTS

West Henson, New York, N. Y.

Application July 8, 1948, Serial No. 37,716

8 Claims. (Cl. 88—57)

My invention relates to that class of devices known as lens systems to produce stereoscopic effects and more particularly to the employment of a resolving screen to produce these effects.

I am aware that it is well known to produce stereoscopic effects by a moving lens or one or more fixed wide angle lenses in conjunction with one or more resolving screens.

A great deal of study has been devoted to the number of lenses per inch that is the most satisfactory in these resolving screens and to the structure of the lenses themselves. Aberration has plagued all physicists in this art and various means have been devised to eliminate it. It is realized that such aberrations (as focal depth, spherical, chromatic, radial astigmatism, curvature of the image plane, coma and distortion, all of which occur the more markedly, the greater the obliquity of the light rays refracted by the lens, that is to say, the wider the field of view) cannot be entirely eliminated, but they can be reduced to a satisfactory degree, by reducing the size of the focusing aperture. The assumption that rays emitted from a single point, intersect also, after refraction, to a single point, is virtually correct, with a lens whose aperture does not exceed a ten to twelve degree angle from the edge of the lens to the principal focus. Light valves, compound lenses, and the like have been employed to improve the images formed by these lens systems. It is also known to form the resolving screens of lenticles, bars, crossed bars and the like. I have discovered that instead of the complex systems presently employed on the market, I can produce clear stereoscopic effects by employing a resolving screen composed of lenses having their edges truncated so that square lenses are formed without these least refracting marginal sections. By forming these in sheets I produce a resolving screen of unique design that achieves the purpose of my invention.

The multitudinous patents on this art that I have examined have disclosed the complexity of these systems which, in my opinion, has prevented their becoming of great commercial value.

The principal object of my invention is to provide a lens system to produce stereoscopic effects either in taking pictures or in projecting them from flat two-dimension composite film. Said system being composed of a plurality of lenses forming a screen, each lens having been truncated to reduce aberration without the use of an external light valve.

A further object of my invention is to provide a lens system whereby stereoscopic effects can be obtained in both single reflector and double reflector one-shot color cameras.

A further object of my invention is to produce such cameras that may be adapted for projections by the additive process.

A still further object of my invention is to provide a lens system that is inexpensive to manufacture, simple to operate, and easy to install.

Instead of employing a variated lens system, I have found that in a simple system employing a resolving screen of my particular construction all need of other lens structures is obviated.

In my construction all the individual truncated lenses in the screen have approximately the same focal length. In practice I prefer to employ lenses having a relatively short focal length. However I am aware that longer focal lengths may be employed.

Referring to the drawings that are hereto annexed and made a part hereof in which Fig. I is a diagrammatic optical drawing illustrating the paths of light ways in taking steroscopic pictures.

Fig. II is a diagrammatic optical drawing illustrating the paths of light rays in producing stereoscopic effects in projection of flat film.

Fig. III is a diagrammatic optical drawing illustrating the paths of light rays in taking stereoscopic pictures in a single reflector one-shot color camera.

Fig. IV same as Fig. III employing a double reflector one-shot color camera.

Fig. V is a vertical view of a plano-convex lens partly in section showing my lens construction.

Fig. VI is a vertical view of an ordinary lens employing a light valve.

Fig. VII is an enlarged sectional view of Fig. VIII taken on lines 8—8 showing marginal sections eliminated by my invention.

Fig. VIII is a front view of a lens screen constructed according to my invention.

Fig. IX is a horizontal cross-sectional view of Fig. VIII.

Fig. X is a vertical cross-sectional view of an anastigmatic lens system constructed according to the invention.

Fig. XI is a diagrammatic optical drawing illustrating the paths of light rays in taking stereoscopic pictures with a camera employing a reflector or prism.

Fig. XII is a schematic detail view showing paths of light to audience observers in Fig. II.

Fig. XIII is a schematic detail view showing a projecting lens system.

Fig. XIV is a schematic drawing showing the paths of light in viewing a composite picture.

Fig. XV is a schematic drawing showing my screen employed in reducing the area of total pictures.

Fig. XVI is a schematic drawing showing my screen employed in a television camera.

Fig. XVII is a schematic drawing showing my screen employed with a television cathode ray tube in a television receiving set.

Similar numerals refer to similar parts throughout the entire specification.

Referring to the drawings, I have found that it is usual to provide light valves of the kind described in the patent to D. F. W. Coffey No. 2,063,985 issued December 15, 1936 as illustrated in my Fig. VI wherein opaque shades 2 and 4 are positioned with relation to a wide angle lens 6 so that aberration caused by tapered portions and as clearly shown in Fig. V is reduced. Aberration has been a difficult problem to solve heretofore and various light valve constructions have been tried with more or less unsatisfactory success. I have found in practice that if I truncate the lens by removing the portions 7 and 9 of the lens (see Fig. V), and construct a sheet of the resultant truncated lens 8 as clearly shown in Fig. VII forming thereby a resolving screen of truncated lenses, I can obtain the desired stereoscopic effects by employing only one of these screens in a camera instead of the usual systems which include one or more wide angle lenses such as are now on the market. Referring to Fig. I, I provide in the usual camera frame 1 a resolving screen 10 used as an objective. This objective screen can also be used as a viewing screen. The advantage secured by using the resolving lens screen as an objective in conjunction with a negative film 12 is that the changes in a scene at various angles, when using this screen as a viewing screen with a positive film made from the negative film, closely approaches that view experienced by an observer moving past a real three-dimensional scene.

The refractive index of the screen material forming the lenses and the curvature radii of the lenses determine their focal length, and the screen is so arranged that when properly adjusted the focus of the individual lenses coincide with the emulsion of the negative film or the surface of an image screen.

I have found that for taking pictures the number of lenses can vary from 60 to 1000 per inch, depending upon the quality and definition desired, although this is not the limit that can be reached.

It is obvious that the more lenses per inch the more expensive the camera will be and the greater the resulting picture definition. The limit to the number of lenses per inch is determined by excessive picture distortion resulting from diffraction of the image point and diminished brightness of the image. Diffraction in optics is defined as a modification of light when it passes the edge of a body, or through a small aperture by which the luminous rays deviate from the straight course (or spread out) often producing diffraction spectra through interference of the light rays. The diffraction encountered in the lens screen is that diffraction encountered with an ordinary lens, wherein the effective diameter of the focal spot or diffraction image of a point is increased with a decrease in lens diameter.

This can be readily observed from the following formula where, the diffraction image of a point equals, $\lambda F/D$ wherein $\lambda$ is the wavelength of light, $F$ the focal length of the lens, and $D$ is the diameter of the lens. Therefore the number of lenses per inch that can be successfully used is limited with a given wavelength of light and in order to utilize the maximum number of lenses with satisfactory results, the focal length must be decreased, with a decrease in lens size.

As previously stated the number of lenses per inch is also effected by the light collecting ability of the lenses. The light gathering ability of the lenses is known as lens speed or f/number. Lens speed is defined as the ratio of the focal length to the diameter of the lens. The formula for computing this is f/number equals $F/D$ wherein $F$ is the focal length and $D$ is the diameter of the lens. Focal length remaining the same, the smaller the f/number the greater the amount of light transmitted by the lens or the greater its speed and the larger the diameter of the lens. Therefore in decreasing the area of the individual lenses, to produce more lenses per inch, the light collecting ability of the lenses is decreased. To correct this undesirable loss of light, the illumination of the object photographed or picture projected, can be increased or the focal length can be decreased.

Therefore in order that the light collecting ability of the lenses be kept at a maximum and the diffraction image of a point source of light be kept at a minimum, when decreasing the size of the individual lenses to gain greater picture definition, the focal length of the lenses should be reduced in the proper proportions. In practice since the lenses are a fractional part of an inch in size, the focal length should also be kept at a fractional part of an inch if sufficient light and image quality is to be maintained.

The diameter of the lenses for good definition is limited to the condition that the light ray transmitted through the center of the lens shall differ in path length to the film, or image screen, by one-half of one wave-length of light, from that of a ray at the edge of the lens. Hence if $\lambda$ equals one wavelength
$R$ equals the radius of the lens
$D$ equals the shortest distance from center of lens to film or image screen $D$ plus $\lambda/2$ equals distance from edge of lens to same point on film or image screen and considering these light rays as forming a right angle triangle, then the hypothenuse squared equals the sum of the squares of the two legs, or $$(D \text{ plus } \lambda/2)^2 \text{ equals } R^2 \text{ plus } D^2$$

solving for $R$, we obtain $$R^2 \text{ equals } (D \text{ plus } \lambda/2)^2 - D^2 \text{ equals } D^2 \text{ plus } 2D\lambda/2 \text{ plus } \lambda^2/4 - D^2$$

neglecting $\lambda^2/4$, because it is very small, we have $$R \text{ equal } \sqrt{\lambda D}$$

Since the lenses are at maximum aperture at all times because of the lack of an external iris, the amount of light admitted to the camera is governed only by the conventional shutter.

The number of lenses to the inch to use for satisfactory image or picture definition as suggested in the present invention was derived from the light formulas mentioned, considering the longest visible wavelength of red light as .0000313 of an inch, and the principal focus, or focal length as being equal to the radius of lens curvature.

I may form this resolving screen 10 of glass or organic plastics. With plastics the lenses can be very easily formed by the roller, mould or die stamp methods, but since in practice I have found that plastic, even though formed and moulded from the same batch, often produces a lens of different expansion characteristics, I prefer to form my screens of glass.

In any lens system for forming a composite image, it is necessary that light rays are brought to a focus by lenses having approximately the same focal length. Therefore as clearly shown in Fig. I, I have shown the objective 10 with an aperture space between the opening A—B sufficiently wide to admit only the light rays necessary to cover the film. It is clear to those skilled in the art that in practice the lens screen 10 would be in front of and adjacent the negative film 12. I have shown it widely separated in the drawings merely to illustrate the light rays forming the stereoscopic effects. Thus C D in the objective 10 forms image #C' D' on the film so illustrated. Means to vary the distance between the objective 10 and the negative film in order to focus distant or near objects more distinctly on the film, and also prevent excessive overlapping of the pictures at their boundaries, is old and usual in the art and will not be described. However fixed focus cameras are also able to employ my invention and good stereoscopic effects have been obtained by arranging the objective in fixed focal relation to the negative film.

Fig. II shows a method of projecting stereoscopic pictures wherein an ordinary projector 14 is used with a composite picture 13 formed by my camera as described in Fig. I. The lens screen 10a is essentially the same lens system as used in the camera of Fig. I. I have shown a usual image screen 16 of opaque or translucent material or the like in the rear of my lens screen 10a. Each separate part of the composite picture being a picture of the object taken from a different angle. For each picture there is a lens in the lens screen to focus that particular picture on the image screen as clearly shown.

The image screen 16 and resolving viewing screen 10a can be placed in a fixed or variable position relative to each other. At the instant the viewing screen 10a focuses the images of the object on the image screen 16 it also projects the reflected images to the observer as shown by the arrowed lines M—M in Fig. II.

Thus it is clear that from an observer's position O the images reflected from the image screen 16 will appear as left and right images producing the desired stereoscopic effect. I have clearly shown this in Fig XII.

In Fig. XI is a modification of Fig. I, the reflector 18 shown can be replaced by a prism to prevent loss of light from reflection.

It is of course well known that when a composite positive photographic print or a composite printed picture of said photograph is enlarged and a duplicate of the objective lens screen (through which the photograph was made) is used as a viewing screen, then the duplicate will be enlarged in the same ratio as the picture.

In projection when the composite image is enlarged, the viewing screen lenses should be enlarged in the same ratio as the image.

It is necessary that the stereoscopic picture of an object approach the definition and smoothness in change of views at various angles that is presented to the eyes of an observer at a real three-dimensional scene.

Therefore when photographing an object for projection, the objective screen should have the maximum number of lenses per inch, being limited only by the quality of picture desired.

As shown in Fig. XIII my unique lens system may be employed to produce stereoscopic effects from a projected two-dimensional composite picture.

A light 21 is positioned behind a two-dimensional positive film 15 carrying a composite picture, in front of which I place a lens screen 10, said composite picture having been printed from a negative picture photographically made with screen 10 or a duplicate. See Fig. I. By adjusting the position of screen 10 with relation to film 15, a clear image of the composite picture is produced, which is intercepted and formed upon the usual image screen 16 by another lens screen 23. Lens screen 23 is an enlarged duplicate of screen 10, and enlarged in the same ratio as the desired projected image. It is clear that for each picture produced by the use of my lens screen in producing a composite picture 15, one lens must be in the viewing screen 23 of Fig. XIII.

In other words if the lens screen 10 was composed of 300 lenses per linear inch (90,000 per sq. inch) then the viewing screen 23 must have the total number of lenses that the lens screen 10 had, regardless of the size of the screen 23. The screens 23 and 16 are sufficiently large to be observed by a large group of people. The truncated lenses of screen 10 have a relatively long focal length, though determined by the desired size of the image of the projected picture, and the distance desired between screens 10 and 23. To enable screens 23 and 16 to be closely assembled, the lenses of screen 23 have a relative short focal length.

I have found in practice that stereoscopic photographs and printed composite pictures can be made to be viewed by reflected or transmitted light by employing my unique screen. Both of these then produce a stereoscopic effect on the observer.

Referring to Fig. XIV I show a picture 22 of a composite positive made in accordance with my invention (see Fig. I). Spaced from this picture 22 at the same distance used in taking the picture I place my resolving screen 10. In this manner a stereoscopic effect of these pictures is produced on the observer.

In order to gain greater detail in projected pictures without increasing the number of lenses per inch of the lenses taking the picture I have illustrated in Fig. XV by a schematic drawing a device suitable for this purpose. The object 26 to be photographed is placed before a lens screen 10 of my unique construction which comprises for example 300 lenses per inch. This lens screen and a translucent image screen 24 in this example are three inches in length, thus there are 270,000 lenses in this screen. The image on the image screen 24 could then be photographed on a one inch negative film 26 in an ordinary camera. The resulting composite film (as 13 in Fig. II) will contain 270,000 pictures which ordinarily would require 270,000 lenses for a one inch screen which is considered not practical at this time.

In order to project this one inch composite, 270,000 lenses would be required in the viewing screen as 23 of Fig. XIII regardless of total size, thus gaining the effect of 900 lenses per inch at screen 10 but using only 300 per inch.

It is realized that the negative film 12 of the camera Fig. I in the present invention could be replaced by the image surface of an electronic device for converting light images into electrical impulses such as a television camera or facsimile apparatus, and the image screen 16 of Fig. II could be replaced by the fluorescent image screen section of a cathode ray tube and similar apparatus to produce stereoscopic effect still employing my unique lens screen.

Referring to Figs. XVI and XVII I have illustrated the application of my lens system to television.

In Fig. XVI, I show the frame 28 of an iconoscope inside of which is the usual target mosaic 30. In front of the target 30 I place my screen 10. Thus in taking a picture of an object 32 through the lens 34 of the television camera stereoscopic effects are produced so that a stereoscopic image will result as seen in Fig. XVII where the observer 36 in looking toward the television tube 38 has the effect of stereoscopic pictures produced upon him by the interposition of my lens screen 10 as shown.

To produce stereoscopic effects in color, using the subtractive method, I have found that if I employ one of my screens in each the reflecting and the transmitting plane of semi-transparent mirrors a fine stereoscopic effect results. Thus referring to Figs. III and IV, I have shown the paths of the light rays through my screen. Though the lens screens are shown replacing the conventional light filters, filters can be used if desired. The color break down in the film I have designated generally as 19. The additive method of projection can also be used by inserting a composite positive film and placing a suitable light source 20 behind each film, as shown by the broken line in Fig. IV.

Though a simple lens structure is shown and described, other lens systems can be truncated to conform with the present invention. An anastigmatic system 22 can be used where further improvement in image quality or a greater focal length is desired, as shown in Fig. X.

Having described my invention what I regard as new and desire to protect by Letters Patent:

1. A stereoscopic system comprising camera means for photographing a scene, a series of truncated lens elements forming a lens sheet and operative to independently focus elemental areas of a scene upon a photographic recording surface disposed in said camera means so as to photograph said scene, and projector means for viewing a projected beam of a photographic representation derived from the photographic recording surface, said projector means including a resolving screen duplicating the lens structure of said lens sheet in enlarged form and a viewing screen adjacent to and behind said resolving screen, said resolving screen being operative to individually re-focus the elemental areas of said projected beam onto said viewing screen.

2. A stereoscopic system according to claim 1 and wherein said photographic recording surface is a negative film and said photographic representation is a print derived therefrom.

3. A stereoscopic system comprising camera means for photographing a scene, a series of truncated lens elements forming a lens sheet and operative to independently focus elemental areas of a scene upon a photographic recording surface disposed in said camera means so as to photograph said scene, and projector means for viewing a projected beam of a photographic representation derived from the photographic recording surface, said projector means including a viewing screen and a resolving screen adjacent to and in front of said viewing screen, said resolving screen duplicating the lens structure of said lens sheet and being operative to individually re-focus the elemental areas of said projected beam from said viewing screen.

4. A stereoscopic system comprising camera means for photographing a scene, a series of truncated lens elements forming a lens sheet and operative to independently focus elemental areas of a scene upon a photographic recording surface disposed in said camera means so as to photograph said scene, and projector means for viewing a projected beam of a photographic representation derived from the photographic recording surface, said projector means including a viewing screen and a resolving screen adjacent to and in front of said viewing screen, said resolving screen duplicating the lens structure of said lens sheet, said resolving screen being operative to individually re-focus the elemental areas of said projected beam when said beam travels from said resolving screen to said viewing screen and when said beam is reflected back from said viewing screen through said resolving screen.

5. In a stereoscopic system for viewing a photographic representation, projector means for viewing a projected beam derived from said photographic representation, said projector means comprising a resolving screen formed of a series of truncated lens elements forming a lens sheet, a viewing screen adjacent to and behind said resolving screen, said resolving screen being operative to individually focus elemental areas of said projected beam which pass from said viewing screen through said resolving screen.

6. In a stereoscopic system for viewing a composite picture including elemental areas of a scene taken from different angles, projector means for viewing a projected beam derived from said composite picture, said projector means comprising a resolving screen formed of a series of truncated lens elements forming a lens sheet, a viewing screen adjacent to and behind said resolving screen, said resolving screen being operative to individually re-focus said elemental areas of said projected beam which travel from said viewing screen and through said resolving screen.

7. In a stereoscopic system for viewing a composite picture including elemental areas of a scene taken from different angles, projector means for viewing a projected beam derived from said composite picture, said projector means comprising a resolving screen formed of a series of truncated lens elements forming a lens sheet, a viewing screen adjacent to and behind said resolving screen, said resolving screen being operative to individually re-focus said elemental areas of said projected beam which travel from said viewing screen and through said resolving screen, the lens elements of said resolving screen being correlated with the elemental areas of said composite picture so that each of the elemental areas of said composite picture are re-focused by an individual lens element of said resolving screen.

8. In a stereoscopic system for viewing a composite picture including elemental areas of a scene taken from different angles, projector means for viewing a projected beam derived from said composite picture, said projector means comprising a resolving screen formed of a series of individual and contiguous lens elements forming a lens sheet, a viewing screen adjacent to and behind said resolving screen, said resolving screen being operative to individually re-focus said elemental areas of said projected beam which travel from said viewing screen and through said resolving screen, the lens elements of said resolving screen being correlated with the elemental areas of said composite picture so that each of the elemental areas of said composite picture are re-focused by an individual lens element of said resolving screen.

WEST HENSON.

REFERENCES CITED

The following references are of record in the file of this patent:

UNITED STATES PATENTS

| Number | Name | Date |
|---|---|---|
| 1,549,579 | Lenouvel | Aug. 11, 1925 |
| 1,862,847 | Draper | June 14, 1932 |
| 1,935,471 | Kanolt | Nov. 14, 1933 |
| 1,970,311 | Ives | Aug. 14, 1934 |
| 1,993,272 | Goodwin | Mar. 5, 1935 |
| 2,021,162 | Walton | Nov. 19, 1935 |
| 2,063,985 | Coffey | Dec. 15, 1936 |
| 2,086,182 | Dvornik | July 6, 1937 |
| 2,086,556 | Jacobson | July 13, 1937 |
| 2,154,868 | Jenies | Apr. 18, 1939 |
| 2,183,249 | Schering et al. | Dec. 12, 1939 |
| 2,186,123 | Rantsch et al. | Jan. 9, 1940 |